March 21, 1950     M. PEQUIGNOT     2,501,290
METHOD FOR TREATING FLUIDS BY RADIATION
Filed Jan. 21, 1947
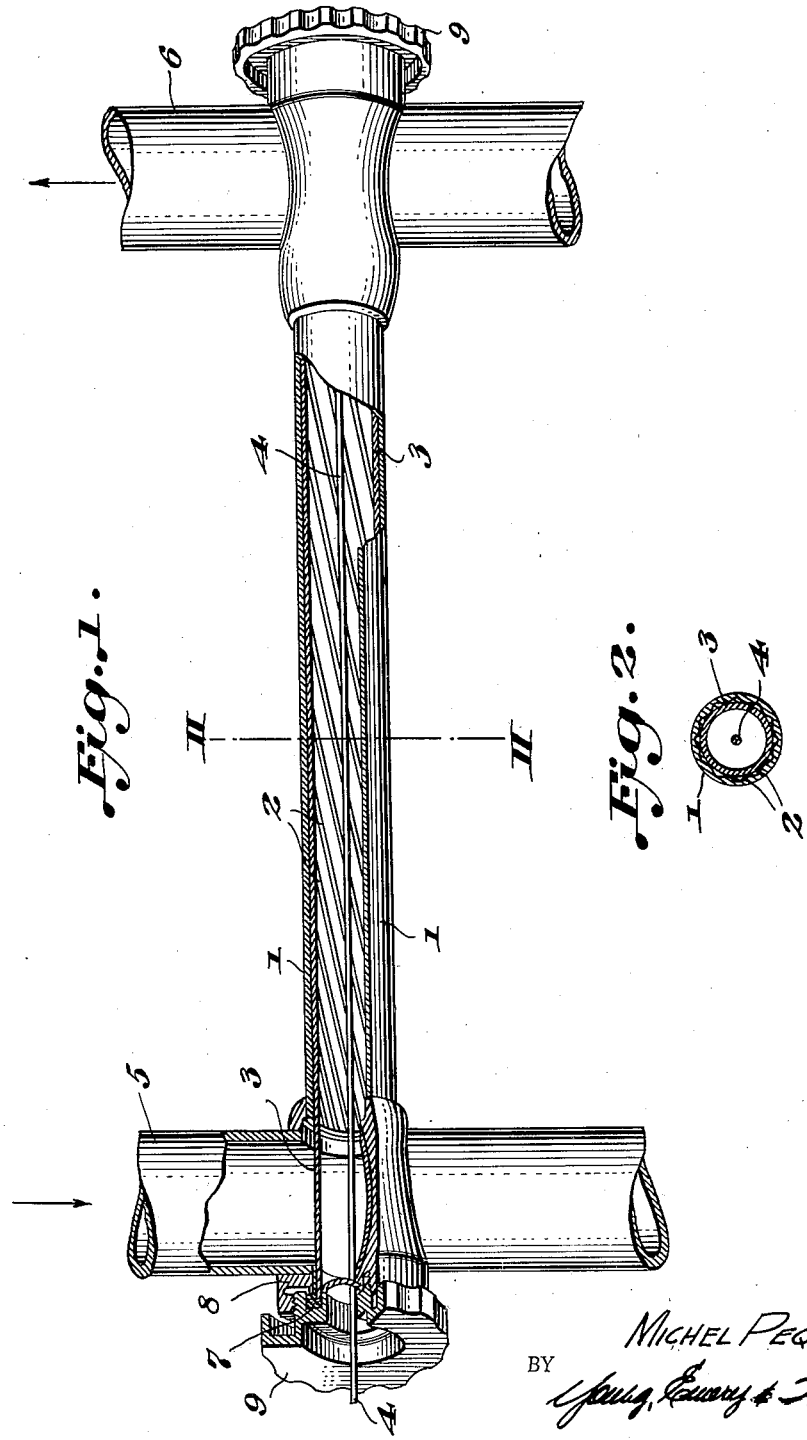
INVENTOR
MICHEL PEQUIGNOT
BY *Young, Emery & Thompson*
ATTORNEYS Patented Mar. 21, 1950

2,501,290

UNITED STATES PATENT OFFICE 2,501,290

METHOD FOR TREATING FLUIDS BY RADIATION

Michel Pequignot, Grenoble, France

Application January 21, 1947, Serial No. 723,391
In France July 10, 1946

4 Claims. (Cl. 250—48)

My invention concerns the treatment of fluids consisting in submitting the fluids to a source of radiations such as luminous, ultra-violet, X-ray, radioactive or other sources.

The treatment of fluids by radiation (luminous or otherwise) is subject to two principal conditions, namely:

(1) The necessity of working under protection from the air in order to avoid secondary actions, principally the intense oxidation very often due to the ionisation of the ambient oxygen by the radiations employed, and (2) The necessity of presenting the fluid, which is always non-transparent or substantially non-transparent, to the radiations in very thin layers.

In the methods and apparatus at present employed for this purpose, the fluid to be treated is generally passed between two transparent walls, either in thin sheets or divided into streams of small dimensions, or into clusters of transparent tubes of very small diameter.

The industrial application of the aforesaid apparatus is rendered difficult owing to their small output, which is a function of the pressure of the fluid, the latter being very rapidly limited by the low resistance of the materials employed (glass, quartz, etc.). A fortiori, it is impossible to employ them in operations which must necessarily take place at high pressure (chemical syntheses, treatment of fluids containing dissolved gases, etc.).

Furthermore, the homogeneity of the treatment in such apparatus is always very defective owing to the unequal distribution of the pressures in the tubes or channels, and above all owing to the considerable irregularity of the section of flow, which is due to the lack of precision inherent in the material and in the machining necessarily applied.

It is known, in fact, that the output of a channel of small section is proportional to the fourth power of its diameter, so that extremely variable outputs arise when this diameter differs by small amounts.

It is also to be observed that the field of the radiations intended to act either on a cluster of tubes or on the inner and outer faces of a sleeve is not uniform, however ingenious the systems employed may be, and that even if it were uniform the variation of the incidences and of the refraction indices of the transparent materials result in the different generatrices of the surfaces subjected to radiations being very unevenly affected.

The present invention relates to a method which permits of remedying these disadvantages and of increasing the efficiency and the output of the irradiation apparatus.

In this method which comprises the displacement of the fluid to be treated in channels subjected to the action of the source of radiation, there is combined with the speed of longitudinal displacement of the fluid a form of the channels which ensures a turbulent relative movement of the fluid past the source of radiation. Owing to this movement, there are set up inside the fluid mass in movement both internal molecular sliding motions and a rotation of the fluid mass on itself. Consequently, all the molecules of the mass to be treated come successively into contact with the active surface limiting the channel of flow. This results in all the parts of the fluid mass in movement being subjected to the radiation and causes a very homogeneous activation.

In one form of the method, the turbulent relative movement is obtained by passing the fluid mass in channels of helicoïdal form about the source of radiation. With this arrangement, the fluid circulated in each channel is subjected to centrifugal force due to its circular movement, and this action is added to those resulting from the speed of flow and from the section of the channel to ensure a relative movement which sets up an intense agitation of the molecules and ensures their regular exposure to the radiation from the source.

In order to carry this method into effect, the helicoïdal channels are preferably located inside a metal tube, in which they can be readily machined with accuracy (in the manner of the rifling of a firearm). Into the metal tube having internal channels there is introduced another tube, which is transparent to radiation and surrounds the source of radiation.

The inner surface of the metal tube and the outer surface of the transparent tube coincide exactly. They are finished by grinding, so that each channel traced in the opaque material is closed at its free surface by a window of transparent material.

With this device, there is obtained on the same tube a series of channels of precise dimensions, since they are machined in metal, the surface of the transparent tube being smooth and simply trued by grinding. These channels afford an equal distribution of the fluid which results in equal losses of pressure in the different channels for all outputs, regardless of the admission pressure. It is not possible to obtain this advantage with the known devices, in which the channels are made entirely in the transparent material, which cannot be exactly cut or moulded to precise dimensions.

The device formed by a metal wall and an inner tubular transparent element is particularly resistant to pressure. Whereas the usual apparatus are constituted solely of a transparent material of low resistance, in the device according to the invention the outer part which must withstand the forces of extension is made of metal and can withstand high pressures without difficulty. The transparent part is only subjected to compressive forces, which it easily withstands. It is thus possible to employ high pressures and therefore to obtain high outputs. In addition, the apparatus withstands accidental super-pressures (hammering) without difficulty.

Furthermore, only a small part of the device consists of transparent material, whereby a saving of this special material is effected. The transparent material is also protected from shocks, so that the apparatus is rendered resistant and does not break easily.

A further essential advantage in the case of industrial apparatus resides in the fact that it is possible to dismantle the fluid-carrying member instantly into two parts. The cleaning operation which constitutes an almost impossible task in apparatus comprising a member which cannot be dismantled, is here extremely simple.

It is also to be noted that only apparatus of the type according to the invention employ a single source of radiation which constitutes a considerable saving and in addition permits of a central arrangement of the source of radiation inside the transparent tube whereby a perfectly uniform field of radiation is obtained, which is essential to the homogeneity of the treatment.

The method and the device forming the subject of the invention are applicable to the treatment of all fluids. Thus, they may be employed for the activation of milk by means of ultraviolet rays or the treatment of other liquids such as wine. They may also be employed for the treatment of gases by irradiation, for example for gaseous synthesis. They may be employed regardless of whether the radiation employed is luminous, actinic, radioactive or simply thermal.

A form of embodiment of the device according to the invention is illustrated, by way of example, in the accompanying drawings, in which:

Figure 1 is a longitudinal sectional view in perspective of a part of an element, and Figure 2 is a cross-sectional view on the line II—II of Figure 1.

This device is constituted by a tubular metal jacket 1, for example of stainless steel. Helicoidal grooves 2 of suitable pitch, for example of a pitch corresponding to the total length of the tube 1, are machined in the inner surface of this tube. The channels 2 may have any regular goemetrical section, it having been found that the most suitable section for maximum output and for facility of construction is an equilateral triangle having rounded angles.

Inside the jacket 1 is disposed a tube 3 of material which is transparent to the radiations in question. For example, in the case of ultra-violet rays, the tube 3 consists of fused quartz. The outer surface is strictly calibrated and polished.

The tube 3 extends at either end beyond the external tube 1. Inside the tube 3 and in the center thereof is located the source of radiation 4, such as an ultra-violet ray generator (tubular mercury-vapour lamp or the like). A selecting filter (not shown) may be associated with this source.

The extremities of the jacket 1 are connected to conduits 5, 6, namely an admission conduit 5 and a delivery conduit 6. The connection with the transparent tube 3 is effected by means of suitable joints comprising a plastic element 7 rigidly mounted on a support 8. The fluid to be treated is admitted through the conduit 5. When it reaches the left-hand extremity of the tube 1, it can only pass into the helicoidal channels 2. The dimensions of these channels are such that the fluid assumes the velocity necessary for its eddying in the said channels.

The particles of fluid are thus strongly agitated, while the rotation of the stream of fluid on itself brings them all successively into contact with that part of the channels 2 which is limited by the surface of the transparent tube 3. They are thus subjected to the radiation from the source 4.

According to the requirements of output and the duration of sensitization of the fluid, a certain number of elements identical to that hereinbefore described are grouped in series or in parallel. In particular, high outputs are obtained with a simple construction by connecting several tubes 1 and 3 in series to conduits 5 and 6. The elements 1—3 are superposed without complications and without substantially increasing the overall dimensions.

The foregoing description naturally only applies to one form of embodiment of the invention and any modifications may be made in the application of the method without departing from the subject of the present invention.

I claim:

1. Apparatus for the treatment of fluids by radiations which comprises two tubes tightly fitted into each other, the inner tube made of a material transparent, to said radiations and the outer tube made of an opaque metal and provided on its internal surface with longitudinal grooves of substantially triangular cross-section, a source of radiations arranged axially of said tubes and extending from one to the other end thereof, and means connecting the ends of said tubes with intake and discharge means respectively for the fluid being treated.

2. Apparatus for treatment of fluids by radiations which comprises two tubes tightly fitted into each other, the inner tube transparent to said radiations and the outer tube made of an opaque metal and formed on its inner surface with helical grooves of substantially triangular cross-section, a source of radiations disposed axially of said tubes and extending from one to the opposite end thereof and means connecting the respective ends of said tubes with intake and discharge means for said fluid.

3. Apparatus for the treatment of fluids by radiations which comprises two tubes tightly fitted into each other, the inner tube transparent to said radiations and the outer tube made of an opaque metallic material and formed on its inner surface with grooves of substantially triangular cross section extending from one to the opposite end of said tubes, a source of radiations arranged axially of said tubes and extending from one to the opposite end thereof, and means connecting the respective ends of said tubes with intake and discharge means for said fluid.

4. Apparatus for the treatment of a fluid by radiations which comprises a parallel plurality of tubular elements, each element comprising a pair of tubes tightly fitted into each other, the inner tube transparent to said radiations and the outer tube made of an opaque metal and formed on its inner surface with longitudinal grooves of substantially triangular cross-section extending therealong, each said tubular element having an axially disposed radiating source extending throughout the entire length thereof, and means connecting said respective tubular elements at each end thereof with an intake and a discharge conduit respectively for said fluid.

MICHEL PEQUIGNOT.

REFERENCES CITED

The following references are of record in the file of this patent:

UNITED STATES PATENTS

| Number | Name | Date |
| --- | --- | --- |
| 1,056,619 | Armstrong | Mar. 18, 1913 |
| 2,034,184 | Hartman | Mar. 17, 1936 |
| 2,309,124 | Knott | Jan. 26, 1943 |
| 2,338,388 | Whitman | Jan. 4, 1944 |

FOREIGN PATENTS

| Number | Country | Date |
| --- | --- | --- |
| 439,744 | France | June 21, 1912 |